US006938103B2

United States Patent
Azzarito et al.

(10) Patent No.: US 6,938,103 B2
(45) Date of Patent: Aug. 30, 2005

(54) UNIVERSAL SERIAL BUS TRANSACTION PROCESSING TASKS SCHEDULING METHOD FOR COMPUTER SYSTEM, INVOLVES ASSIGNING TRANSACTION TO PERIODIC QUEUE HEAD LIST WITH FASTER POLLING INTERVAL

(75) Inventors: Doug Azzarito, Round Rock, TX (US); Robert A. Rose, Hillsboro, OR (US)

(73) Assignee: Dell Products L.L.P., Round Rock, TX (US)

( * ) Notice: Subject to any disclaimer, the term of this patent is extended or adjusted under 35 U.S.C. 154(b) by 501 days.

(21) Appl. No.: 10/036,070

(22) Filed: Oct. 19, 2001

(65) Prior Publication Data

US 2003/0079061 A1 Apr. 24, 2003

(51) Int. Cl.⁷ .............................................. G06F 13/00
(52) U.S. Cl. ................................ 710/6; 710/5; 710/54; 710/305; 710/310; 710/313
(58) Field of Search ........................ 710/5–7, 305–306, 710/310–315, 52–54, 33–35, 20–21, 261–269, 8, 10, 15, 16–19, 36–39, 46–47, 60–61; 707/100–104

(56) References Cited

U.S. PATENT DOCUMENTS

| | | | | |
|---|---|---|---|---|
| 5,802,394 A | * | 9/1998 | Baird et al. .................... 710/5 |
| 5,933,611 A | * | 8/1999 | Shakkarwar ................. 710/306 |
| 5,958,020 A | * | 9/1999 | Evoy et al. ..................... 710/3 |
| 6,119,194 A | * | 9/2000 | Miranda et al. ............. 710/306 |
| 6,272,499 B1 | * | 8/2001 | Wooten ....................... 707/102 |
| 6,272,515 B1 | * | 8/2001 | Fouquet ...................... 709/101 |
| 6,349,354 B1 | * | 2/2002 | Garney ........................ 710/127 |
| 6,505,263 B1 | * | 1/2003 | Larson et al. ............... 710/100 |
| 6,625,602 B1 | * | 9/2003 | Meredith et al. .............. 707/8 |
| 6,721,815 B1 | * | 4/2004 | Leete ............................ 710/6 |
| 6,728,801 B2 | * | 4/2004 | Leete et al. .................. 710/54 |
| 6,804,740 B1 | | 10/2004 | Watts, Jr. .................... 710/303 |
| 2002/0116565 A1 | * | 8/2002 | Wang et al. ................. 710/313 |

\* cited by examiner

*Primary Examiner*—Paul R. Myers
*Assistant Examiner*—Raymond N Phan
(74) *Attorney, Agent, or Firm*—Baker Botts L.L.P.

(57) ABSTRACT

An apparatus and method is provided for scheduling USB transaction processing tasks. A periodic queue head list associated with a USB host controller is configured to be processed once every polling period. The periodic queue head list describes a location of the USB transaction processing tasks scheduled for processing. The entries in a frame list of the USB host controller are linked to identify a corresponding periodic queue head list. A USB transaction processing task processed by the USB host controller is assigned to one of the periodic queue head list. A desired response time for the USB transaction processing task is matched with the polling period of the periodic queue head list.

27 Claims, 5 Drawing Sheets

UNIVERSAL SERIAL BUS TRANSACTION PROCESSING TASKS SCHEDULING METHOD FOR COMPUTER SYSTEM, INVOLVES ASSIGNING TRANSACTION TO PERIODIC QUEUE HEAD LIST WITH FASTER POLLING INTERVAL

BACKGROUND OF THE INVENTION

1. Field of the Invention

The present invention relates to computer systems. More specifically, the present invention relates to a computer system that includes a Universal Serial Bus ("USB").

2. Description of the Related Art

Personal computer ("PC") systems in general and IBM compatible PC systems in particular have attained widespread use. These PC systems handle information and primarily give independent computing power to a single user (or a relatively small group of users in the case of a PC network). Such computer systems are generally inexpensively priced for purchase by individuals or small businesses and provide computing power to many segments of today's modem society.

A computer system can usually be defined as a desktop, floor-standing, or portable microcomputer that includes a system unit having a central processing unit ("CPU" or a "processor"), volatile and/or non-volatile memory, a display monitor, a keyboard, one or more floppy diskette drives, a hard disk storage device, an optional DVD or CD-ROM drive, and an optional printer. A computer system also includes a commercially available operating system, such as Microsoft Windows™ or Linux. A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These I/O devices are typically plugged into connectors of computer system I/O interfaces such as serial interfaces and parallel interfaces, for example. Generally, these computer systems use a system board or motherboard to electrically interconnect these devices.

Computer systems also typically include basic input/output system ("BIOS") programs to ease programmer/user interaction with the computer system devices. More specifically, BIOS provides a software interface between the system hardware and the operating system/application program. The operating system ("OS") and application program typically access BIOS rather than directly manipulating I/O ports, registers, and control words of the specific system hardware. Well known device drivers and interrupt handlers access BIOS to, for example, facilitate I/O data transfer between peripheral devices and the OS, application program, and data storage elements. BIOS is accessed through an interface of software interrupts and contains a plurality of entry points corresponding respectively to the different interrupts. In operation, BIOS is typically loaded from a BIOS ROM or BIOS EPROM, where it is nonvolatile stored, to main memory from which it is executed. This practice is referred to as "shadowing" or "shadow RAM" and increases the speed at which BIOS executes.

Although the CPU provides the "kernel" of the computer system, I/O communication between an I/O device and the CPU forms a basic feature of computer systems. Many I/O devices include specialized hardware working in conjunction with OS specific device drivers and BIOS routines to perform functions such as information transfer between the CPU and external devices, such as modems and printers, coupled to I/O devices.

The USB is an example of one such type of an I/O device coupled to the computer system. The USB peripheral bus specification standard was developed by companies representing the PC and telecommunications industry. Specifically, the USB technology standard was established through a cooperative effort of Compaq Corp., Digital Equipment Corp., IBM PC Co., Intel Corp., Microsoft Corp., NEC Corp., and Northern Telecom Corp. The USB standard and its hardware and software implementation are well-known in the computer industry. The USB brings the plug-and-play capability of computer peripherals outside the PC computer system. This eliminates the need to install cards into dedicated computer slots, reconfigure the system each time a peripheral is attached or detached from the PC and resolve potential IRQ conflicts. Computer systems equipped with USB allow computer peripherals to be automatically configured when physically attached without the need to reboot or run setup. The USB allows multiple USB compatible devices, potentially up to 127, to run simultaneously on a computer system, with peripherals such as monitors and keyboards functioning as additional plug-in sites or hubs.

The USB bus topology enables USB devices to be connected with a USB host. There are two types of personalities for a USB device: a hub and a function. The hub is a device, which provides additional attachment points for the USB. The function provides capabilities to the computer system, e.g., an ISDN connection, a digital joystick, a speaker, a keyboard, a mouse, etc. There is usually one host computer on any USB system. The USB interface to the host computer system, e.g., the computer system, is referred to as the host controller. The USB host controller may be implemented in a combination of hardware, firmware, or software. A root hub is integrated within the host system to provide one or more attachment points. A device endpoint refers to a uniquely identifiable portion of a USB device (hub or function) that is a source or sink of information in a communication flow between host and USB device.

All USB bus transactions typically involve the transmission of up to three packets of information. Each transaction begins when the USB host controller sends a USB packet describing the type and direction of transaction, the USB device address, and endpoint number. This packet is referred to as the token packet. The USB device that is addressed by the token packet selects itself by decoding the appropriate address fields of the token packet. In a given transaction, data is transferred either from the host to a device or from a device to the host. The direction of data transfer is specified in the token packet. The source of the transaction then sends a handshake packet indicating whether the transfer was successful.

Currently there is support for two USB host controller standards. The USB Open Host Controller Interface ("OHCI") host controller standard is primarily supported by Compaq, Inc., amongst others. The Universal Host Controller Interface ("UHCI") is primarily supported by Intel, Inc. amongst others. With reference to the Universal Host Controller Interface standard, the USB host controller ("UHC") is responsible for scheduling USB bus transactions. The USB host controller implements a 1024-element array, referred to as the frame list, where each element (or entry) included in the frame list provides a pointer to the USB transactions that should be processed within 1 millisecond period, referred to as the predefined time slot. Every millisecond, the next consecutive element in the frame list is processed in a sequential, round-robin manner. Thus, the frame list requires 1024 milliseconds ("ms") to process all the 1024 possible elements or entries in the frame list before it recycles.

The following is hereby incorporated by reference: The Universal Bus Specification, Revision 2.0, published Apr. 27, 2000; Universal Host Controller Interface (UHCI) Design Guide, Revision 1.1, March 1996, published by Intel, Inc.; and OpenHCI—Open Host Controller Interface Specification for USB, Revision 1.0a, October 1996, published by Compaq, Inc.

SUMMARY OF THE INVENTION

It has been discovered that a method and system may be used for scheduling USB transaction processing tasks. In one embodiment, a periodic queue head list associated with a USB host controller is configured to be processed once every polling period. The periodic queue head list describes a location of the USB transaction processing tasks scheduled for processing. The entries in a frame list of the USB host controller are linked to identify a corresponding periodic queue head list. A USB transaction processing task processed by the USB host controller is assigned to one of the periodic queue head list. A desired response time for the USB transaction processing task is matched with the polling period of the periodic queue head list.

In one embodiment, a computer system to implement the method of scheduling USB transaction processing tasks is described. The computer system also includes a processor, a memory, a USB host controller and a program executable by the processor. The program stores periodic queue head lists associated with a USB host controller in the memory. Each of the periodic queue head list is configurable to be processed once every polling period. The program links entries in a frame list of the USB host controller to identify a corresponding periodic queue head list stored in the memory. The program assigns a USB transaction processing task scheduled to be processed by the USB host controller to one of the periodic queue head lists stored in the memory.

In one embodiment, a computer-readable medium providing access to a program implementing the method of scheduling USB transaction processing tasks is described. The program stores periodic queue head lists associated with a USB host controller in a memory, the USB host controller and the memory being included in a computer system. Each of the periodic queue head list is configurable to be processed once every polling period. The program links entries in a frame list of the USB host controller to identify a corresponding periodic queue head list stored in the memory. The program assigns a USB transaction processing task scheduled to be processed by the USB host controller to one of the periodic queue head lists stored in the memory.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

The following description of the invention is intended to be illustrative only and not limiting.

Figure 1A:
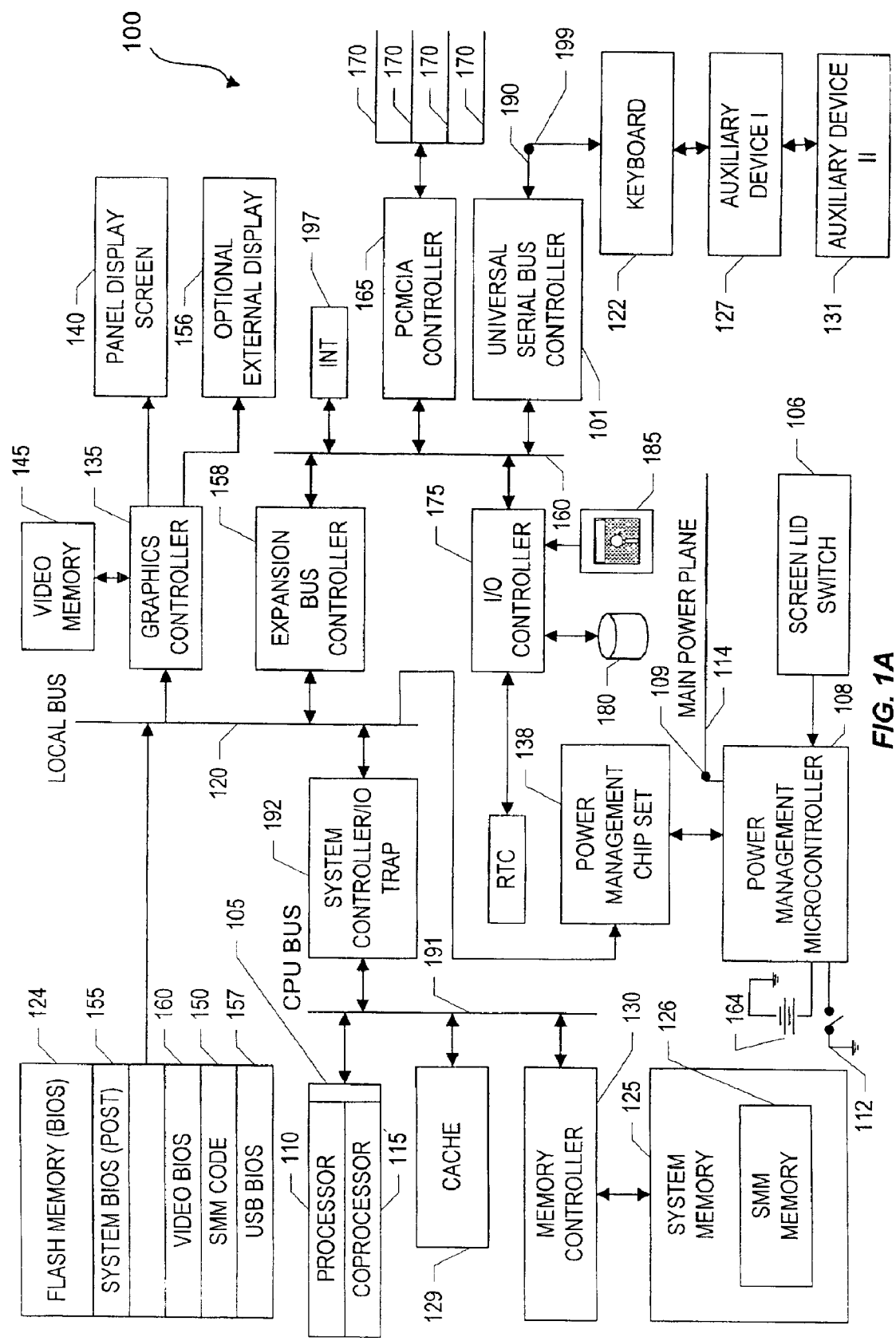
FIG. 1A illustrates a computer system incorporating a USB BIOS, according to the present invention.

Referring to FIG. 1A, computer system 100 includes a microprocessor ("CPU") 105, for example, an Intel Pentium™ class microprocessor or Intel 80486™ class microprocessor, having a processor 110 for handling integer operations and a coprocessor 115 for handling floating point operations. CPU 105 is coupled to cache 129 and memory controller 130 via CPU bus 191. System controller I/O trap 192 couples CPU bus 191 to local bus 120 and is generally characterized as part of a system controller such as a Pico Power Vesuvious or an Intel™ Mobile Triton chip set. System controller I/O trap 192 can be programmed in a well-known manner to intercept a particular target address or address range, and, upon intercepting a target address, system controller I/O trap 192 asserts an intercept signal indicating that CPU 105 attempted to access the target address.

A main memory 125 of dynamic random access memory ("DRAM") modules is coupled to local bus 120 by a memory controller 130. Main memory 125 includes a system management mode memory area which is employed to store converter code to implement conversion methodology embodiments as will be discussed in more detail subsequently.

A (BIOS) memory 124 is coupled to local bus 120. A FLASH memory or other nonvolatile memory is used as BIOS memory 124. A BIOS program (not shown) is usually stored in the BIOS memory 124. The BIOS program includes software for interaction with the computer system boot devices such as the keyboard, the mouse, or a USB keyboard. The BIOS memory 124 stores the system code which controls some computer system 100 operations.

A graphics controller 135 is coupled to local bus 120 and to a panel display screen 140. Graphics controller 135 is also coupled to a video memory 145 which stores information to be displayed on panel display 140. Panel display 140 is typically an active matrix or passive matrix liquid crystal display ("LCD") although other display technologies may be used as well. Graphics controller 135 can also be coupled to an optional external display or standalone monitor display 156. One graphics controller that can be employed as graphics controller 135 is the Western Digital WD90C24A graphics controller.

A bus interface controller or expansion bus controller 158 couples local bus 120 to an expansion bus 160. In this particular embodiment, expansion bus 160 is an Industry Standard Architecture ("ISA") bus although other buses, for example, a Peripheral Component Interconnect ("PCI") bus, could also be used. A personal computer memory card international association ("PCMCIA") controller 165 is also coupled to expansion bus 160 as shown. PCMCIA controller 165 is coupled to a plurality of expansion slots 170 to receive PCMCIA expansion cards such as modems, fax cards, communications cards, and other input/output devices. Interrupt request generator 197 is also coupled to ISA bus 160 and issues an interrupt service request over a predetermined interrupt request line after receiving a request to issue interrupt instruction from CPU 105.

An I/O controller 175, often referred to as a super I/O controller is coupled to ISA bus 160. I/O controller 575 interfaces to both an integrated drive electronics ("IDE") hard drive 180 and a floppy drive 185.

A USB bus 190 enables the computer system's 100 USB host controller 101 to communicate with USB devices such as a USB keyboard 122. In one embodiment, a USB host controller 101 controls transfer of data to and from CPU 110 via ISA bus 160. The USB host controller 101 may be based on the Universal Host Controller Interface standard or the Open Host Controller Interface standard, depending on the implementation choice. The USB keyboard 122, auxiliary device I 127, and auxiliary device II 131 are exemplary USB devices connected serially to USB connector 199. This interconnection topology is implemented according to the USB technology standard. External devices which include USB keyboard 122, auxiliary device I 127, and auxiliary device II 131 communicate with CPU 105 via USB host controller 101. Auxiliary devices may include any USB compatible devices such as a mouse, modem joystick, or another computer system. When USB host controller 101 receives data from the connected external USB devices, USB host controller 101 issues an interrupt request to CPU 105. CPU 105 interprets the interrupt request as a request for service from a conventional communication interface and attempts to process the interrupt request accordingly. However, as described in more detail below, a USB servicing routine is executed instead. In one embodiment, the USB host controller 101 may include an on-board CPU (not shown) enabled to process USB transactions. Computer system 100 may be used to implement the method of scheduling Computer system 100 includes a power supply 164, for example, a battery, which provides power to the many devices which form computer system 100. Power supply 164 is typically a rechargeable battery, such as a nickel metal hydride ("NiMH") or lithium ion battery, when computer system 100 is embodied as a portable or notebook computer. Power supply 164 is coupled to a power management microcontroller 108 which controls the distribution of power from power supply 164. More specifically, microcontroller 108 includes a power output 109 coupled to the main power plane 114 which supplies power to CPU 105. Power microcontroller 108 is also coupled to a power plane (not shown) which supplies power to panel display 140. In this particular embodiment, power control microcontroller 108 is a Motorola 6805 microcontroller. Microcontroller 108 monitors the charge level of power supply 164 to determine when to charge and when not to charge battery 164. Microcontroller 108 is coupled to a main power switch 112 which the user actuates to turn the computer system 100 on and off. While microcontroller 108 powers down other portions of computer system 100 such as hard drive 180 when not in use to conserve power, microcontroller 108 itself is always coupled to a source of energy, namely power supply 164.

In a portable embodiment, computer system 100 also includes a screen lid switch 106 or indicator 106 which provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer which swings from an open position for interaction with the user to a close position.

Computer system 100 also includes a power management chip set 138, which includes power management chip models PT86C521 and PT86C522 manufactured by Pico Power. Power management chip set 138 is coupled to CPU 105 via local bus 120 so that power management chip set 138 can receive power control commands from CPU 105. Power management chip set 138 is connected to a plurality of individual power planes which supply power to respective devices in computer system 100 such as hard drive 180 and floppy drive 185, for example. In this manner, power management chip set 138 acts under the direction of CPU 105 to control the power to the various power planes and devices of the computer. A real time clock ("RTC") 140 is coupled to I/O controller 175 and power management chip set 138 such that time events or alarms can be transmitted to power management chip set 138. Real time clock 140 can be programmed to generate an alarm signal at a predetermined time.

When computer system 100 is turned on or powered up, the system BIOS software stored in non-volatile BIOS memory 124 is copied into main memory 125 so that it can be executed more quickly. This technique is referred to as "shadowing" or "shadow RAM" as discussed above. At this time, SMM code 150 is also copied into the system management mode memory area 126 of main memory 125. CPU 105 executes SMM code 150 after CPU 105 receives a system management interrupt ("SMI") which causes the microprocessor to enter SMM. Additional conditions under which an SMI is generated are discussed subsequently. It is noted that along with SMM code 150, also stored in BIOS memory 124 and copied into main memory 125 at power up are system BIOS 155 (including a power on self test module-POST), USB BIOS 157 and video BIOS 160. The USB BIOS 157 includes BIOS software configurable to perform a method of scheduling USB transactions as described in further detail below. It will be recognized by those of ordinary skill in the art that other memory mapping schemes may be used. For example, SMM code 150 may be stored in fast SRAM memory (not shown) coupled to the local/CPU bus 120.

In one embodiment, the computer system 100 includes a computer-readable medium having a computer program or computer system 100 software accessible therefrom, the computer program including instructions for performing the method of scheduling USB transactions. The computer-readable medium may typically include any of the following: a magnetic storage medium, including disk and tape storage medium; an optical storage medium, including compact disks such as CD-ROM, CD-RW, and DVD; a non-volatile memory storage medium; a volatile memory storage medium; and data transmission or communications medium including packets of electronic data, and electromagnetic or fiber optic waves modulated in accordance with the instructions.

Figure 1B:
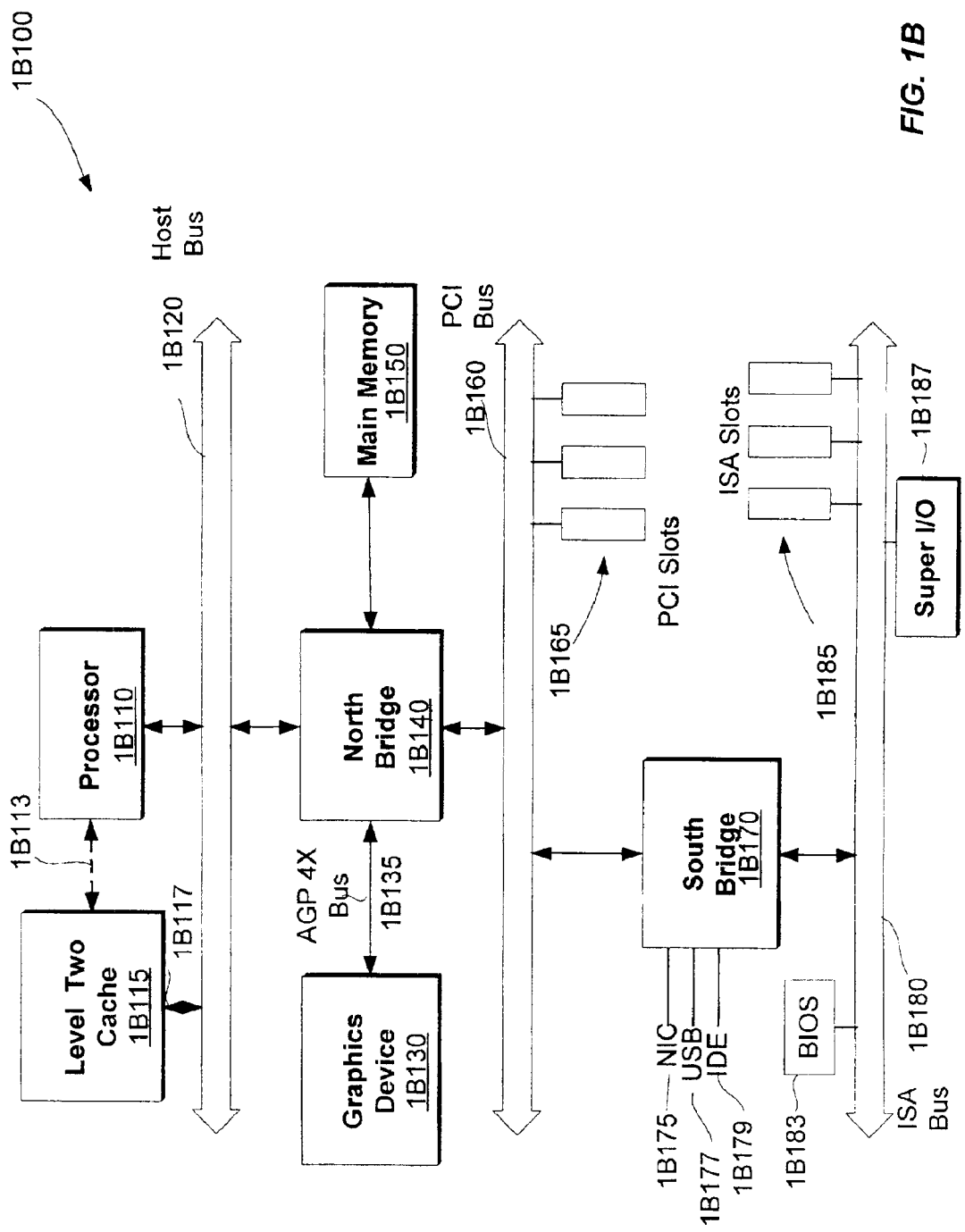
FIG. 1B illustrates another embodiment of a computer system incorporating a USB BIOS, according to the present invention.

Referring to FIG. 1B, another exemplary computer system 1B100 shows a simplified example of a computer system in which a method of scheduling USB transaction processing tasks may be implemented. Computer system 1B100 may be configured to perform substantially similar functions as computer system 100 of FIG. 1A and/or execute substantially similar software programs. The computer system 1B100 may also be referred to as a PC system. The computer system 1B100 includes a processor 1B110, which may also be referred to as a CPU. Typical examples of processors included in the computer system 1B100 are an Intel Pentium™ class microprocessor or an AMD Athlon™ class microprocessor. The processor may include one or more processors. For example, the processor may include a processor 1B110 for handling integer operations and a coprocessor (not shown) for handling floating point operations. The processor 1B110 is coupled to the host bus 1B120. The host bus 1B120 is typically a high-speed bus. In one embodiment, the computer systems may include more than one processor coupled to the host bus 1B120. A level two (L2) cache memory 1B115 is coupled to processor 1B110 through either the host bus 1B120 (via connection 1B117) or a back-side bus 1B113.

A north bridge 1B140, which may also be referred to as a "memory controller hub" or a "memory controller", is coupled to main system memory 1B150. The north bridge 1B140 connects with the system processor 1B110 via the host bus 1B120 and system memory 1B150. The north bridge 1B140 is generally considered an application specific chip set that provides connectivity to various buses, and integrates other system functions such as memory interface. For example, an Intel 820E and/or 815E chip set available from Intel provides at least a portion of the north bridge 1B140 functionality described below. The chip set may also be packaged as an application specific integrated circuit ("ASIC"). The north bridge 1B140 typically includes functionality to couple the main system memory 1B150 to other devices within the computer system 1B100. Thus memory controller functions such as cache memory and main memory control functions typically reside in the north bridge 1B140. Main memory 1B150 includes a memory area, which is employed to store instructions to implement various embodiments of a method of scheduling USB transaction processing tasks as will be discussed in more detail subsequently. In addition the north bridge provides bus control to handle transfers between the host bus 1B120 and a second bus, e.g., a PCI bus 1B160. The second bus may also include other industry standard buses or proprietary buses. Thus the north bridge couples processor 1B110, L2 cache 1B115, graphics device 1B130 (e.g., via AGP bus 1B135), main memory 1B150, and host bus 1B120 to all PCI bus 1B160 connected devices.

The south bridge 1B170 typically includes functionality to couple the ISA bus 1B180 to the PCI bus 1B160. The south bridge 1B170 also typically includes interfaces to additional devices or busses such as a network interface card 1B175 for local area network connection, USB host controller 1B177 for USB bus and IDE controller 1B179 for hard disks. In one embodiment, the USB host controller 1B177 may be used to implement a method of scheduling USB transaction processing tasks.

Figure 2:
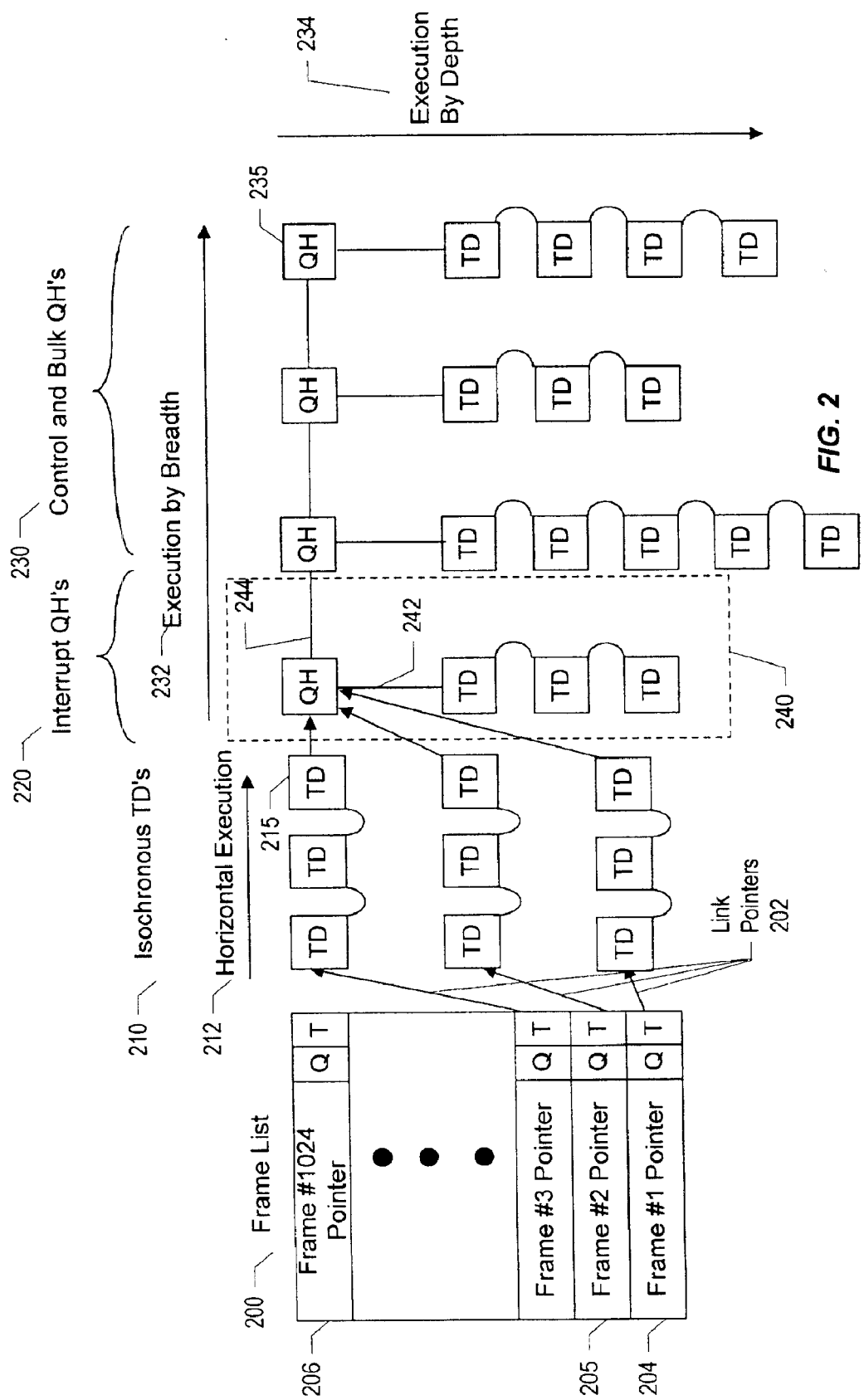
FIG. 2 illustrates a Universal Host Controller Interface based block diagram to process USB transactions.

Referring to FIG. 2, a typical Universal Host Controller Interface implementation of the USB host controller 101 standard showing a schedule of tasks for the USB host controller 101 is illustrated. The Universal Host Controller Interface data structure includes a frame list 200, an isochronous or periodic transfer descriptor, queue heads and queued transfer descriptors. These data structure components, which are described in further detail below, are used by the Universal Host Controller Interface to schedule and process USB transactions. The Universal Host Controller Interface software is programmed with the starting address, e.g., frame #1 204, of the frame list and then released to execute the schedule.

The frame list 200 includes a 1024-element array. Each of the 1024 possible elements included in the frame list array describes a pointer, also referred to as the link pointer 202, to the transfer descriptor ("TD") 215 or a link pointer 202 to queue head ("QH") 235. The USB host controller 101 uses the link pointer 202 to determine where to find the next transfer descriptor or queue head to execute. A transfer descriptor describes a discrete USB packet. Specifically, the transfer descriptor points to data buffers and includes information about the addressing, data and general behavior characteristics of the USB transaction. A queue head 235 allows for a list of transactions to be scheduled for processing.

Flow through the schedule of processing USB transactions is based on link pointers 202 in the frame list 200, transfer descriptors 215, and queue heads 235. Link pointers 202 are the fundamental component used to connect all the scheduled data "objects" together. The USB host controller 101 uses the link pointer 202 to determine where to find the next transfer descriptor 215 to execute.

At the start of a frame, the USB host controller 101 repeatedly follows link pointers 202, beginning at the current frame list index, pausing its traversal to perform USB transactions described in transfer descriptors, and stopping when the frame expires (or when a terminate bit is set).

The frame list 200 is an array of 1024 entries that represent a window in time. Each entry corresponds to a particular frame (e.g., 1 ms). An entry serves as a reference to the to transactions the USB host controller 101 should conduct during that frame. Each entry contains a link pointer 202 to other data structures (transfer descriptors or queue heads) and control bits. The USB host controller 101 typically does not update fields in the frame list 200. The USB host controller driver software (not shown) usually manages the fields in the frame list entries.

The USB host controller 101 does not execute beyond the 1 millisecond typically allocated to the current frame. The host controller driver typically insures that any manipulation of entries be accomplished in a way that does not cause a coherency problem if the USB host controller 101 needs to access the same entry.

Transfer descriptors 215 include a link pointer 202 to a data buffer. Transfer descriptors also include control and status fields for the data and its transmission or reception. A transfer descriptor may optionally have no data buffer associated with it (e.g., may include NULL data). There are transfer descriptors for isochronous transfers 210 and queued transfers (such as interrupt transfer descriptors, control transfer descriptors, and bulk transfer descriptors). All transfer descriptors typically have the same structure. During execution, the USB host controller 101 may update fields in the transfer descriptor, as appropriate. The USB host controller 101 maintains the transfer descriptor in a consistent state (e.g., not allow accesses to partially modified transfer descriptor).

Figure 4:
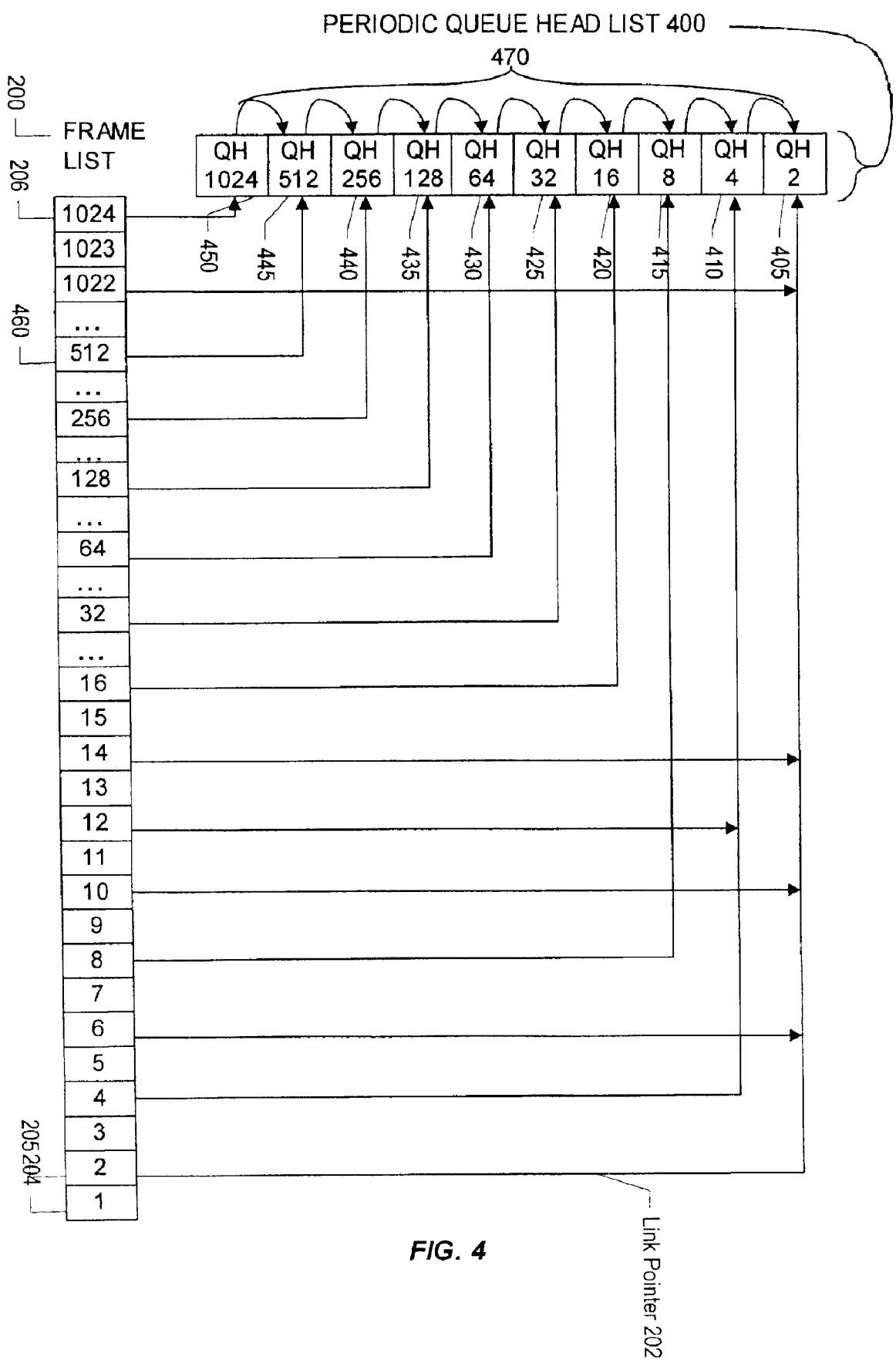
FIG. 4 illustrates a Universal Host Controller Interface based block diagram to process USB transactions using the method described in FIG. 3.

For isochronous operations, the Universal Host Controller Interface driver software builds separate transfer descriptors for each transfer and links them into the schedule in the correct frame as requested by USB driver. All temporal ordering is the responsibility of software. The USB host controller 101 fetches the transfer descriptor and generates the proper transaction on USB. The execution flow is always horizontal 212 as shown in FIG. 4. For isochronous transfers, transfer descriptors are linked to a specific point in real time. Transfer descriptors that do not complete successfully on time are not retried. The transfer descriptor list is horizontally executed until the end of the transfer descriptor list is reached. The last transfer descriptor in the list may point to a queue head 235 for processing of queued transfer descriptors.

Queue heads 235 are data structures that organize non-isochronous transfer descriptors into queues. A queue head 235 and an associated transfer descriptor list form a Q context 240. Interrupt, control, and bulk data transfer types may be placed in queues. The Universal Host Controller Interface typically services interrupt queues 220 first, followed by control and bulk queues 230. During execution, the USB host controller 101 updates fields in the transfer descriptors and queue heads, as appropriate. Queues included in a queue head 235 may be accessed directly from a frame list entry or from the last transfer descriptor in an isochronous transfer descriptor list. Queues may also be accessed from a prior Q context 240. Queue heads include two pointers, a vertical pointer 242 that selects the next transfer descriptor in the Q context 240 to be processed, and a horizontal pointer 244 that provides a link to the next queue head or transfer descriptor to be processed. The vertical pointer may also point to another queue head. Queued transfers that do not complete successfully will generally not be retried until the framelist entry they are linked to recycles. When queues are being processed, execution flow may be from one transfer descriptor to the next within a Q context 240 (execution by depth 234) or from one queue head to the next queue head (execution by breadth 232) where only one transfer descriptor in each Q context 240 is executed at a time. A field in the executing transfer descriptor determines whether the execution is by depth or breadth. For execution by depth 234, the execution flow traverses vertically through the transfer descriptors of the same Q context 240 until the end is reached or transfer descriptor execution is blocked; in which case, the execution flow moves to the next queue head in the link. For execution by breadth 232, one transfer descriptor is executed in a Q context 240 and then the flow is to the next queue head where the first transfer descriptor in that Q context 240 is executed, and so on.

The link pointer 202 typically describes or points to a physical memory 125 location of a transfer descriptor 215. The transfer descriptor identifies the location of at least one USB transaction processing task that is to be processed. The USB host controller schedules isochronous (or periodic) transactions according to a specific frame list entry, such that an isochronous transaction can be processed as soon as possible. The isochronous transactions are scheduled for processing by placing a first isochronous transaction on a frame corresponding to the entry to be processed next and then placing pointers to subsequent isochronous transactions on subsequent consecutive frames. USB data streaming applications, such as data sent to USB speakers may be scheduled as described above.

Depending on the length of the list of isochronous transactions for a specific frame, there may be time left over to handle interrupt, control and bulk transactions. A pointer at the end of each isochronous transaction chain points to head of the interrupt queue head list, allowing the interrupt transactions to be handled on an "as time allows" basis. Once the first isochronous transaction is scheduled and processed it is automatically dequeued, e.g., removed from the queue head list. Another transaction packet, e.g., a second isochronous transaction is created and queued if the USB device requires another transaction to be processed. Isochronous transfer descriptors which cannot be completed within the 1 millisecond time are not retried.

Figure 3:
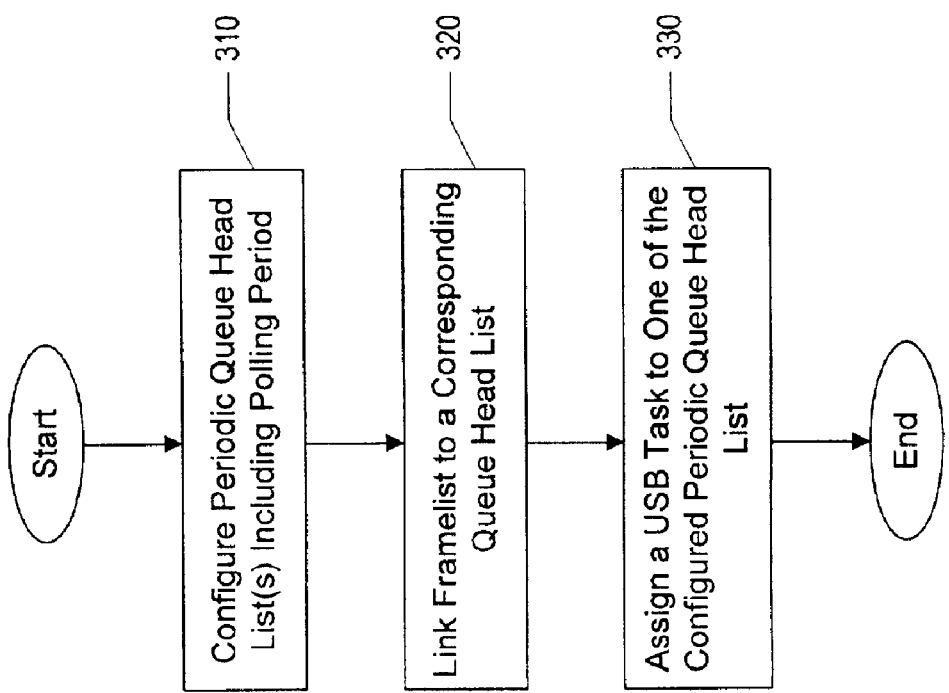
FIG. 3 is a flow chart illustrating the operation of a method to schedule periodic USB transactions according to the present invention.

Referring to FIG. 3, a flow chart for a method of scheduling USB transaction processing tasks is illustrated. In step 310, a periodic queue head list is configured. The periodic queue head list is a special queue head list, which is processed once every unique polling period. The polling period is configurable. In one embodiment the number of special queue head lists configured, and hence the number of polling periods, may vary. In one embodiment, the number of special queue head lists configured is equal to 10. The maximum number of polling periods is typically 11. The polling period may vary from 1 millisecond to 1024 milliseconds. In one embodiment, the polling period is calculated as $2^N$ milliseconds, where N varies from 1 to 10, where 10 represents the number of special queue head lists configured. Thus, in one embodiment, the polling periods for the periodic queue head list are configurable as 2 milliseconds, 4 milliseconds, 8 milliseconds, 16 milliseconds, 32 milliseconds, 64 milliseconds, 128 milliseconds, 256 milliseconds, 512 milliseconds and 1024 milliseconds.

In step 320, the entries in the frame list 200 are linked to the corresponding periodic queue head lists. For example, every alternate entry in the frame list 200 starting with the second time frame 205 would include a link pointer 202 to the 2 milliseconds periodic queue head. Similarly, every eighth entry in the frame list starting with the $8^{th}$ time frame would include a link pointer 202 to the 8 milliseconds periodic queue head. The $1024^{th}$ entry 206 in the frame list 200, i.e., the last entry, would include a link pointer 202 to the 1024 milliseconds periodic queue head. The linkage between entries in the frame list 200 and a corresponding periodic head list may be set as permanent (non-configurable) in one embodiment or it may be set as configurable in another embodiment. In one embodiment, the entries in the frame list 200, which do not have a corresponding link pointer 202 to a periodic queue head list, may store null data or non-periodic transactions.

In step 330, a USB transaction processing task, such as performing a read from a USB keyboard device 122 or performing a write to a USB speaker, is assigned to one of the periodic queue head lists, with a desirable polling period. The performance requirements of a USB device may thus be matched with a desirable polling period. For example, a USB keyboard 122 or a mouse may be polled every 2 milliseconds during the USB BIOS 157 execution phase. Once the assignment of a USB transaction to a periodic queue head list is performed the Universal Host Controller Interface scheduling software does not have to reschedule and queue the same event repeatedly. The assignment of the USB transaction to a periodic head list is permanent, unless it is de-queued by the Universal Host Controller Interface scheduling software if the software determines that the USB transaction is no longer required.

Referring to FIG. 4, the block diagram illustrates one embodiment of the periodic queue head list based on the scheduling method of FIG. 3. The frame list 200 includes entries starting with frame #1 204, incrementing by 1 and ending with frame #1024 206. As described earlier, each frame is typically processed within 1 millisecond and the frame list recycles every 1024 milliseconds.

The number of periodic queue head lists 400 configured may vary from 1 to 11 depending on the application requirement of a particular USB device. In one embodiment, 10 periodic queue head lists 400 each corresponding to a unique polling period are configured. Specifically, the 10 periodic queue head lists configured are: QH 1024 450, QH 512 445, QH 256 440, QH 128 435, QH 64 430, QH 32 425, QH 16 420, QH 8 415, QH 4 410 and QH 2 405. The number included with the periodic queue head list identifier identifies the polling period. For example, the identifier QH 1024 450 identifies a polling period of 1024 milliseconds.

Link pointers 202 are established to link the frame list 200 entries to corresponding periodic queue head list(s) 400. The correspondence is established by configuring a value for the polling period. For example, if the polling period for a periodic queue head list is configured to be 512 milliseconds, then the entry in frame #512 460 of the frame list 200 is linked to the corresponding QH 512 445 periodic queue head list 400. In one embodiment, the link pointers 202 may be established permanently, e.g., may not be configurable. For example, if the duration of the polling period is not anticipated to change the link pointer 202 may be established permanently. However, in one embodiment, if the polling period is anticipated to be modified then the link pointer 202 may be set up to be configurable.

The periodic queue head list 400 provides a data structure, which allows USB drivers to schedule a USB transaction to be processed at the configured periodic interval without the need for an intervention from the USB driver. A USB transaction typically includes processing at least one USB transaction-processing task. A USB transaction-processing task is typically assigned to a particular periodic queue head list during the configuration process. Once configured, the periodic USB transactions and the tasks associated with the transaction are permanently scheduled for automatic execution. The permanently scheduled transactions may be de-queued by the USB driver if it is determined that the transactions are no longer necessary.

The configurable polling rate of the periodic queue head list 400, described above, enables matching the polling rate with the USB device performance. Thus, a wide range of periodic (or polled) transactions associated with USB devices are configurable to be automatically scheduled for processing within a desirable time frame. For example, for a USB BIOS 157 application, USB hub may be assigned to a QH 1024 450 periodic queue head list whereas a USB keyboard 122 may be assigned to QH 2 405 periodic queue head list 400.

In the method using the periodic queue head list 400, only every other frame in the frame list 200 is used. The unused frames, are typically set to null instructions to avoid any memory fetch overhead for every other frame. If the traffic on the USB bus warrants additional processing resources then the unused frames in the frame list may be linked into a new periodic queue head list, e.g., with 1 millisecond polling interval to accommodate fast USB devices. In one embodiment, the unused frames may be linked to a mirrored tree structure similar to the tree structure for the processing of the periodic queue head lists 400. The mirrored tree structure may be used to load balance potential increases in USB traffic. The mirrored tree structure is very similar to the structure for periodic queue head list 400, except that the mirrored tree structure is typically linked into the unused frames of FIG. 4. The USB host controller 101 is enabled to assign USB transactions to one tree or another in a load-balancing scheme. In one embodiment, the mirrored tree may be disabled to decrease the processing time to handle USB transactions on lightly loaded USB systems. In one embodiment, all USB processing tasks in the periodic queue head list 400 with the fastest periodic interval, e.g., QH 2 405 queue head list, may be re-assigned to the unused frames, to even out the loading factor.

The USB devices that want to schedule periodic interrupts need not access the frame list 200. Instead, to schedule a periodic interrupt it is assigned to one of the periodic queue head lists 400 by linking the periodic interrupt task behind the queue head corresponding to the desired polling interval. For example, if a USB device needs to be polled every 8 milliseconds, the USB driver is configurable to link a transaction behind the last task in the 8 milliseconds queue head list, i.e. QH 8 415. That transaction continues to be processed every 8 milliseconds until it is de-queued.

When a frame in the frame list 200 is scheduled for processing, the link pointer 202 will direct it to a corresponding periodic queue head list 400 with an associated polling interval. Any transactions linked to that periodic queue head list are processed first, then any remaining time in that frame is used to process the next fastest polling period. A cascade type pointer 470 identifies the next fastest polling period. For example, when the 8 milliseconds periodic interval queue head is processed, all 8 milliseconds transactions are processed first and any remaining time is allocated to the 4 milliseconds queue head list. If there is still time remaining in the 8 milliseconds frame after processing the 8 milliseconds queue head and the 4 milliseconds queue head, then the remaining time is allocated to the 2 milliseconds queue head.

Non-periodic transactions, such as one-shot control transactions, may be assigned to any periodic queue head list 400. The specific periodic interval selected is dependent on the desired response time to process the transaction. The USB driver is configurable to de-queue the one-shot transactions as soon as they are processed. In one embodiment, a flag associated with the USB transaction is set when the transaction is complete and the USB driver uses the flag to de-queue the one-shot transaction.

The USB frame list 200 structure typically requires that each frame be limited to 1 millisecond. Transactions within a queue head which are not processed within the 1 millisecond are typically deferred to the next frame list processing cycle. Thus a transaction, scheduled to be processed within frame 1024 but which may have been deferred, may have to wait for 1024 milliseconds before it gets another chance to be processed. The method using the periodic queue head list 400 may advantageously provide multiple opportunities for tasks scheduled in QH 2 405, QH 4 410, QH 8 415, QH 16 420, QH 32 425, QH 64 430, QH 128 435, QH 256 440 and QH 512 445 to be processed within 1 frame list cycle.

The Universal Host Controller implementation based on the periodic queue head lists 400 may be advantageously used to interrupt USB transactions. For example, interrupt transactions may be assigned to a desirable polling period and thereby assure that they are processed within the allowable time. The use of periodic queue head lists 400 may also be advantageously used in the USB BIOS 157 implementation. For example, in a USB BIOS 157 implementation, the processing of data from USB boot devices such as a USB mouse and a USB keyboard 122 may be determined to be more important, e.g., be placed at a higher priority compared to the streaming data from USB speakers. In order to capture inputs from a mouse or a USB keyboard 122 in a timely manner, the USB boot device transactions may be assigned to a periodic queue head list 400 with a faster polling interval.

Therefore, a method to schedule USB transactions is shown and described which enables a USB host controller 101 to efficiently schedule USB transactions by reducing memory 125 and CPU 105 requirements. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method of scheduling USB transaction processing tasks comprising:

configuring at least one periodic queue head list associated with a USB host controller, wherein each of the at least one periodic queue head lists is configurable to be processed once every polling period;

linking at least one of a plurality of entries in a frame list of the USB host controller to identify a corresponding periodic queue head list; and assigning a USB transaction processing task processed by the USB host controller to one of the at least one periodic queue head list.

2. The method of claim 1, wherein each of the periodic queue head list describes a location of a list of the at least one USB transaction processing task scheduled to be processed during the polling period.

3. The method of claim 1, wherein each of the plurality of entries in the frame list is processed within a predefined time slot, wherein the plurality of entries of the frame list are consecutively processed from a first entry to an Nth entry, wherein the Nth entry identifies a Nth periodic queue head list, wherein a Nth polling period of the Nth periodic queue head list is defined as N time slots.

4. The method of claim 1, further comprising:

removing the at least one USB transaction processing task from the periodic queue head list on determination that the at least one USB transaction processing task is no longer necessary.

5. The method of claim 1, wherein each of the plurality of entries in the frame list is linked to identify the corresponding periodic queue head list.

6. The method of claim 1, wherein the polling period for each periodic queue list is configurable as 2N milliseconds, wherein N varies from 1 to 10.

7. The method of claim 1, further comprising:

balancing USB transaction processing load by linking at least one unused entry included in the frame list to identify a new corresponding periodic queue head list.

8. The method of claim 1, further comprising:

balancing USB transaction processing load by linking at least one unused entry included in the frame list to identify the at least one periodic queue head list.

9. The method of claim 1, wherein assigning the USB transaction processing task to one of the at least one periodic queue head list comprises matching a desired response time for the USB transaction processing task with the polling period of the at least one periodic queue head list.

10. A computer system comprising:

a processor;

a memory coupled to the processor, wherein a program is stored in the memory;

a USB host controller coupled to the processor and the memory; and wherein the program is enabled to:

store at least one periodic queue head list associated with a USB host controller in the memory, wherein each of the at least one periodic queue head lists is configurable to be processed once every polling period;

link at least one of a plurality of entries in a frame list of the USB host controller to identify a corresponding periodic queue head list stored in the memory; and assign a USB transaction processing task processed by the USB host controller to one of the at least one periodic queue head list stored in the memory.

11. The computer system of claim 10, wherein each of the at least one periodic queue head list describes a location of a list of the at least one USB transaction processing task scheduled to be processed during the polling period.

12. The computer system of claim 10, wherein the at least one of the plurality of entries in the frame list is processed within a predefined time slot, wherein the plurality of entries of the frame list are consecutively processed from a first entry to an Nth entry, wherein the Nth entry identifies a Nth periodic queue head list, wherein a Nth polling period of the Nth periodic queue head list is defined as N time slots.

13. The computer system of claim 10, further comprising:

removing the USB transaction processing task from the periodic queue head list on determination that the USB transaction processing task is no longer necessary.

14. The computer system of claim 10, wherein each of the plurality of entries in the frame list is linked to identify the corresponding periodic queue head list.

15. The computer system of claim 10, wherein the polling period for each periodic queue list is configurable as 2N milliseconds, wherein N varies from 1 to 10.

16. The computer system of claim 10, further comprising:

balancing USB transaction processing load by linking at least one unused entry included in the frame list to identify a new corresponding periodic queue head list.

17. The computer system of claim 10, further comprising:

balancing USB transaction processing load by linking at least one unused entry included in the frame list to identify the at least one periodic queue head list.

18. The computer system of claim 10, wherein assigning the USB transaction processing task to one of the at least one periodic queue head list comprises matching a desired response time for the USB transaction processing task with the polling period of the at least one periodic queue head list.

19. A computer-readable medium having a computer program accessible therefrom, wherein the computer program comprises instructions for:

storing at least one periodic queue head list associated with a USB host controller in a memory, wherein each of the at least one periodic queue head lists is configurable to be processed once every polling period;

linking at least one of a plurality of entries in a frame list of the USB host controller to identify a corresponding periodic queue head list stored in the memory; and assigning a USB transaction processing task processed by the USB host controller to one of the at least one periodic queue head list stored in the memory.

20. The computer-readable medium of claim 19, wherein each of the at least one periodic queue head list describes a location of a list of the at least one USB transaction processing task scheduled to be processed during the polling period.

21. The computer-readable medium of claim 19, wherein the at least one of the plurality of entries in the frame list is processed within a predefined time slot, wherein the plurality of entries of the frame list are consecutively processed from a first entry to an Nth entry, wherein the Nth entry identifies a Nth periodic queue head list, wherein a Nth polling period of the Nth periodic queue head list is defined as N time slots.

22. The computer-readable medium of claim 19, further comprising:

removing the USB transaction processing task from the periodic queue head list on determination that the USB transaction processing task is no longer necessary.

23. The computer-readable medium of claim 19, wherein each of the plurality of entries in the frame list is linked to identify the corresponding periodic queue head list.

24. The computer-readable medium of claim 19, wherein the polling period for each periodic queue list is configurable as 2N milliseconds, wherein N varies from 1 to 10.

25. The computer-readable medium of claim 19, further comprising:
   balancing USB transaction processing load by linking at least one unused entry included in the frame list to identify a new corresponding periodic queue head list.

26. The computer-readable medium of claim 19, further comprising:
   balancing USB transaction processing load by linking at least one unused entry included in the frame list to identify the at least one periodic queue head list.

27. The computer-readable medium of claim 19, wherein assigning the USB transaction processing task to one of the at least one periodic queue head list comprises matching a desired response time for the USB transaction processing task with the polling period of the at least one periodic queue head list.

* * * * *

UNITED STATES PATENT AND TRADEMARK OFFICE
CERTIFICATE OF CORRECTION

PATENT NO. : 6,938,103 B2
DATED : August 30, 2005
INVENTOR(S) : Azzarito et al.

Page 1 of 1

It is certified that error appears in the above-identified patent and that said Letters Patent is hereby corrected as shown below:

Title page,
Item [54], Title, delete "UNIVERSAL SERIAL BUS TRANSACTION PROCESSING TASKS SCHEDULING METHOD FOR COMPUTER SYSTEM, INVOLVES ASSIGNING TRANSACTION TO PERIODIC QUEUE HEAD LIST WITH FASTER POLLING INTERVAL" and replace with -- METHOD OF ASSIGNING UNIVERSAL SERIAL BUS TRANSACTIONS USING INTERVAL-BASED SCHEDULING --.
Item [73], Assignee, delete "Dell Products L.L.P." and replace with -- Dell Products L.P. --.

Signed and Sealed this

Twenty-fourth Day of January, 2006

JON W. DUDAS
*Director of the United States Patent and Trademark Office*